(12) United States Patent
Kapoor

(10) Patent No.: US 9,098,902 B2
(45) Date of Patent: Aug. 4, 2015

(54) SYSTEM AND METHOD FOR ENCODING VIDEO

(75) Inventor: Anand Kapoor, Los Angeles, CA (US)

(73) Assignee: Thomson Licensing, Issy-les Moulineaux Cedex (FR)

( * ) Notice: Subject to any disclaimer, the term of this patent is extended or adjusted under 35 U.S.C. 154(b) by 299 days.

(21) Appl. No.: 12/742,314

(22) PCT Filed: Nov. 12, 2008

(86) PCT No.: PCT/US2008/012684
§ 371 (c)(1),
(2), (4) Date: May 11, 2010

(87) PCT Pub. No.: WO2009/067155
PCT Pub. Date: May 28, 2009

(65) Prior Publication Data
US 2010/0260271 A1    Oct. 14, 2010

Related U.S. Application Data

(60) Provisional application No. 61/003,541, filed on Nov. 16, 2007, provisional application No. 61/003,524, filed on Nov. 16, 2007, provisional application No. 61/003,392, filed on Nov. 16, 2007.

(51) Int. Cl.
*H04N 11/04* (2006.01)
*G06T 5/00* (2006.01)
(Continued)

(52) U.S. Cl.
CPC ............. *G06T 5/002* (2013.01); *H04N 19/117* (2014.11); *H04N 19/154* (2014.11); *H04N 19/162* (2014.11); *H04N 19/179* (2014.11); *H04N 19/46* (2014.11); *H04N 19/86* (2014.11); *G06T 2207/10016* (2013.01); *H04N 19/192* (2014.11); *H04N 19/196* (2014.11); *H04N 19/87* (2014.11)

(58) Field of Classification Search
None
See application file for complete search history.

(56) References Cited

U.S. PATENT DOCUMENTS 6,473,531 B1   10/2002   Kunitake
2001/0012324 A1   8/2001   Normile
(Continued)

FOREIGN PATENT DOCUMENTS

JP   06-006610   1/1994
JP   2000101846   10/1997
(Continued)

OTHER PUBLICATIONS

Search Report dtd May 26, 2009.

*Primary Examiner* — Frederick Bailey
(74) *Attorney, Agent, or Firm* — Robert D. Shedd; Vincent E. Duffy; Michael A. Pugel

(57) ABSTRACT

A system and method for encoding video and reducing video artifacts in the encoded video are provided. The system and method of the present disclosure provide for enabling a user to simply select a preset (e.g., a group of encoding or re-encoding parameters) to fix or provide a starting point to fix video artifacts present in an encoded video. Furthermore, the system and method of present disclosure flag, classify, and organize potential post-encoding related video quality issues, e.g., video artifacts such as banding, dark noise, etc., that are detected during the encoding process. By identifying and categorizing video artifacts, the system and method make the fixing of these video artifacts easier and more precise thereby increasing quality, saving time, and performance.

32 Claims, 13 Drawing Sheets

(51) Int. Cl.
*H04N 19/46* (2014.01)
*H04N 19/117* (2014.01)
*H04N 19/154* (2014.01)
*H04N 19/162* (2014.01)
*H04N 19/179* (2014.01)
*H04N 19/86* (2014.01)
*H04N 19/196* (2014.01)
*H04N 19/192* (2014.01)
*H04N 19/87* (2014.01)

(56) References Cited

U.S. PATENT DOCUMENTS

| | | | |
|---|---|---|---|
| 2001/0017593 A1* | 8/2001 | Saunders et al. | 341/50 |
| 2003/0068093 A1* | 4/2003 | Baggs | 382/261 |
| 2003/0156642 A1 | 8/2003 | Ruol | |
| 2004/0146211 A1* | 7/2004 | Knapp et al. | 382/236 |
| 2004/0210930 A1* | 10/2004 | Cullinan et al. | 725/37 |
| 2005/0188205 A1* | 8/2005 | Alasia et al. | 713/176 |
| 2006/0204115 A1 | 9/2006 | Burazerovic | |
| 2007/0081587 A1* | 4/2007 | Raveendran et al. | 375/240.1 |
| 2007/0201564 A1 | 8/2007 | Joch et al. | |
| 2007/0206871 A1 | 9/2007 | Jalil et al. | |
| 2009/0089852 A1* | 4/2009 | Randolph et al. | 725/131 |
| 2009/0093676 A1* | 4/2009 | Davidson | 600/109 |
| 2011/0075729 A1* | 3/2011 | Dane et al. | 375/240.03 |

FOREIGN PATENT DOCUMENTS

| | | |
|---|---|---|
| JP | 2000506687 | 5/2000 |
| JP | 2009500951 | 1/2007 |
| JP | 2009516939 | 5/2007 |
| WO | WO-97/37322 A1 | 10/1997 |
| WO | WO9737322 | 10/1997 |
| WO | WO 2007/005750 | 1/2007 |
| WO | WO2007005750 | 1/2007 |
| WO | WO 2007/050360 | 5/2007 |
| WO | WO2007050360 | 5/2007 |

* cited by examiner

CONVENTIONAL TAPE WORKFLOW FOR STANDARD DEFINITION CONTENT

TAPELESS WORKFLOW FOR STANDARD AND HIGH DEFINITION CONTENT

SYSTEM AND METHOD FOR ENCODING VIDEO

This application claims the benefit under 35 U.S.C. §365 of International Application PCT/US2008/012684, filed Nov. 12, 2008, which was published in accordance with PCT article 21(2) on May 28, 2009, in English and which claims the benefit under 35 U.S.C.§119 of a provisional applications 61/003,541, 61/003,524 and 61/003,392, filed in the United States on Nov. 16, 2007.

TECHNICAL FIELD OF THE INVENTION

The present disclosure generally relates to computer graphics processing and display systems, and more particularly, to a system and method for encoding video and reducing video artifacts in encoded video.

BACKGROUND OF THE INVENTION

In the past, tape-based standard definition video re-encoding has been a mechanical process, where a compressionist or a video quality engineer would verify the video quality of the source, encode or the re-encode (fixes) and requested video artifact fixes based on their visual findings. Referring to FIG. 1, a conventional tape workflow for encoding a video is illustrated. Generally, a tape is acquired containing a video 10. The tape is then loaded onto a tape drive 12 to be ingested by an encoding system. Various encoding/recoding parameters would be applied to the video 14 and the video would be encoded 16 resulting in an encoded file 18. The compressionist would essentially re-run the tape-based content through the available filtering, digital video noise-reducers, compression and other hardware/software, e.g., multiple iterations, 20 to get the desired re-encoded video output results 22. The multiple iterations of the re-encoding may be encoder driven re-encoding or QC (quality control) driven re-encoding. Encoder driven re-encodings are automatic (can also be manual) re-encodes based on some statistical analysis of bit-rate allocation, video quality/artifact, peak-signal-to-noise ratio, or any combination of these together. QC driven encoding are compressionist or video quality engineer driven re-encodings to improve the video quality that may have been missed by the above statistical analysis process due to the highly random nature of the video content being encoded. Regardless of what is driving the process, the conventional workflow requires tedious back-and-forth work to resolve the video artifacts with no mechanism to capture re-encoding parameters that work well for certain types of artifacts.

The compression codecs used during this time were simple and well understood. This was sufficient for standard definition disc formats as the volume of a video feature that was encoded was quite modest due to physical limitation of older optical storage media. Also, tape-based distribution (e.g., VHS tapes, DLT, etc) was the preferred means to ingest into different avenues of video for standard definition production as assets were fewer, manageable and served well for this particular production. However, this process was time consuming and prone to errors. Furthermore, the conventional tape workflow did not keep a history of fixes other than the last fix, and therefore, did not allow for comparison between versions of fixes.

With the advent of newer increased optical storage space media with supported advance codecs such as H.264 (AVC) and better compression ratio to video quality, it has become possible to make use of this additional disc space for other value added contents such as games, bonus video content, interviews, concerts, picture-in-picture, and events that client/consumers demand today. This has also essentially increased the sheer volume of high-definition video content, increased complexity (multiple systems, softwares, etc) and time necessary for successful encodes, heightened the need to better manage/understand the digital content and increased value added material, however, with a shorter turn around time to complete this additional content material. Using the old conventional standard definition production workflow would not be a viable proposition. This has required moving the high definition production toward tapeless distribution to make this process more cost effective as that would require less physical assets (D5 tapes, DLTs, etc) to keep track and store and make it easier to manipulate/work digitally.

Therefore, a need exists for techniques to overcome the disadvantages of the conventional tapeless digital workflow and better manage the re-encoding process that increases efficiency for the compressionist by enabling reusability of their learning, allowing application of multiple re-encoding properties/tools, and affording ease of use and control.

SUMMARY

A system and method for encoding video and reducing video artifacts in the encoded video are provided. The system and method of the present disclosure provide for enabling a user to simply select a preset (e.g., a group of encoding or re-encoding parameters) to fix or provide a starting point to fix video artifacts present in an encoded video. Moreover, the system and method of the present disclosure provide a mechanism to create a new library of the presets depending on the complexity of video artifacts. These user-generated sets or presets of encoding parameters can be easily applied across multiple scenes or different features and shared among different users.

Furthermore, the system and method of present disclosure flag, classify, and organize potential post-encoding related video quality issues, e.g., video artifacts such as banding, dark noise, etc., that are detected during the encoding process. By identifying and categorizing video artifacts, the system and method make the fixing of these video artifacts easier and more precise thereby increasing quality, saving time, and performance. The system and method also allow users to provide video artifact specific solutions to resolve these video encoding anomalies by employing the user-generated sets or presets of encoding parameters.

According to one aspect of the present disclosure, a method for reducing video artifacts is provided, the method including the steps of receiving source video, encoding said source video, detecting at least two different artifacts in said encoded video, and re-encoding said encoded video based on at least one first user-generated set of encoding parameters such that said at least two artifacts are removed.

In another aspect, the method further includes determining a category for each of the at least two artifacts and selecting the at least one first user-generated set of encoding parameters based on one of the determined categories.

In another aspect, the method includes determining a severity for each of the at least two artifacts and selecting the at least one first user-generated set of encoding parameters based the artifact having the highest determined severity.

According to another aspect of the present disclosure, a method of enabling the reduction of artifacts in encoded video includes receiving source video, said source video having a plurality of frames, encoding said source video, determining if a portion of said plurality of frames of encoded video contain a first type of artifact, displaying the frames of video having said first type of artifact, and enabling a user to select a set of encoding parameters from a plurality of sets of encoding parameters such that the artifacts are reduced when the encoded video is re-encoded.

In a further aspect, the method further includes determining if a second portion of said plurality of frames of encoded video contain the first type of artifact, and if the second portion of said plurality of frames of encoded video contains the first type of artifact, grouping the first and second portion into a single category of artifacts.

According to a further aspect of the present disclosure, a system for encoding video includes an encoder for a source video, said source video having a plurality of frames, an artifact detector for detecting at least two different artifacts in said encoded video, and a plurality of user-generated set of encoding parameters, wherein said encoder re-encodes said encoded video based on at least one first user-generated set of encoding parameters such that said at least two artifacts are removed.

In various aspects, the system includes a categorizer for determining a category for detected artifacts and the artifact detector determines a severity for the detected artifacts. The system will resolve artifacts based on a determined category or the severity of the detected artifacts.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
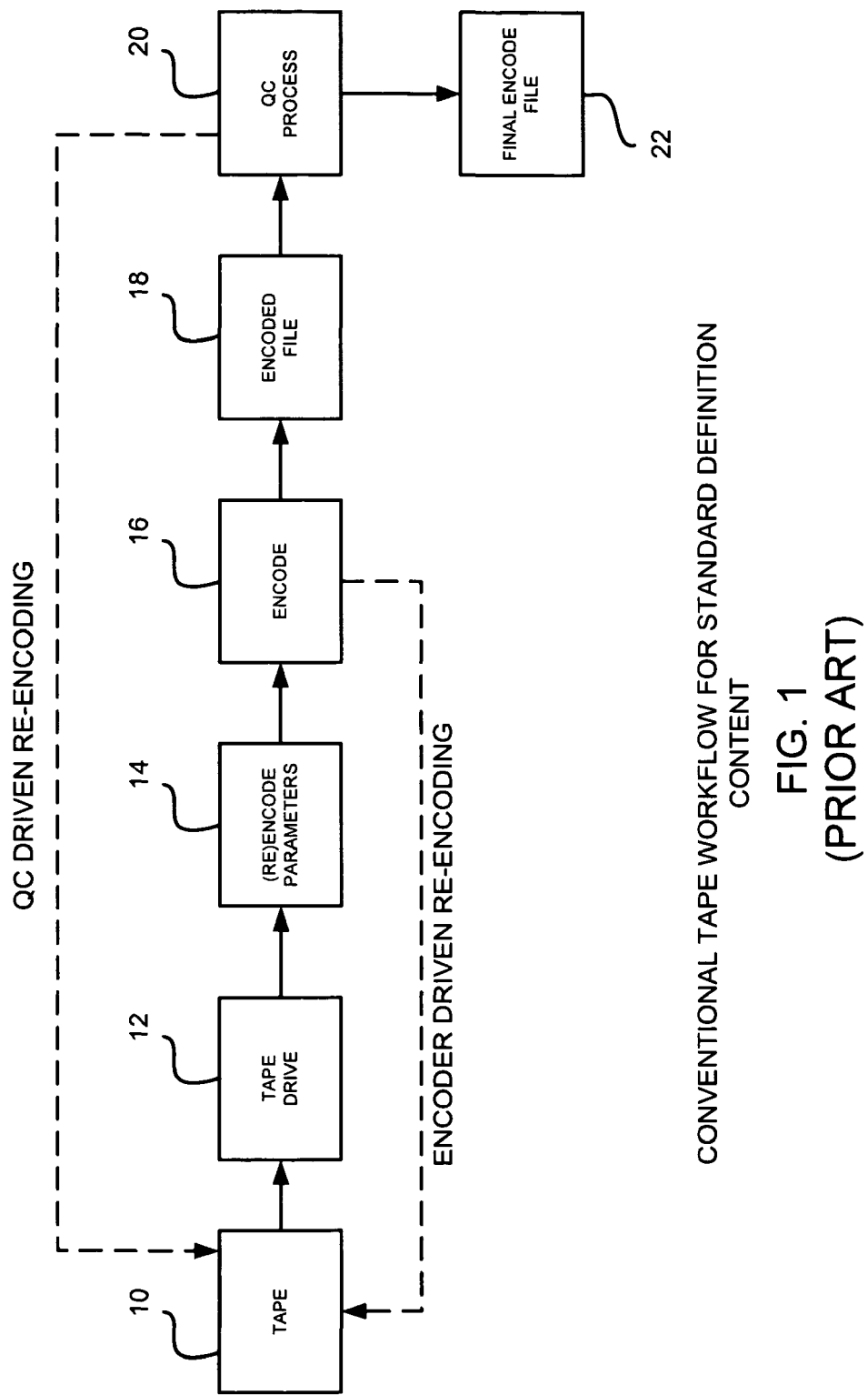
FIG. 1 illustrates a workflow for encoding video from tape according to the prior art.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 2:
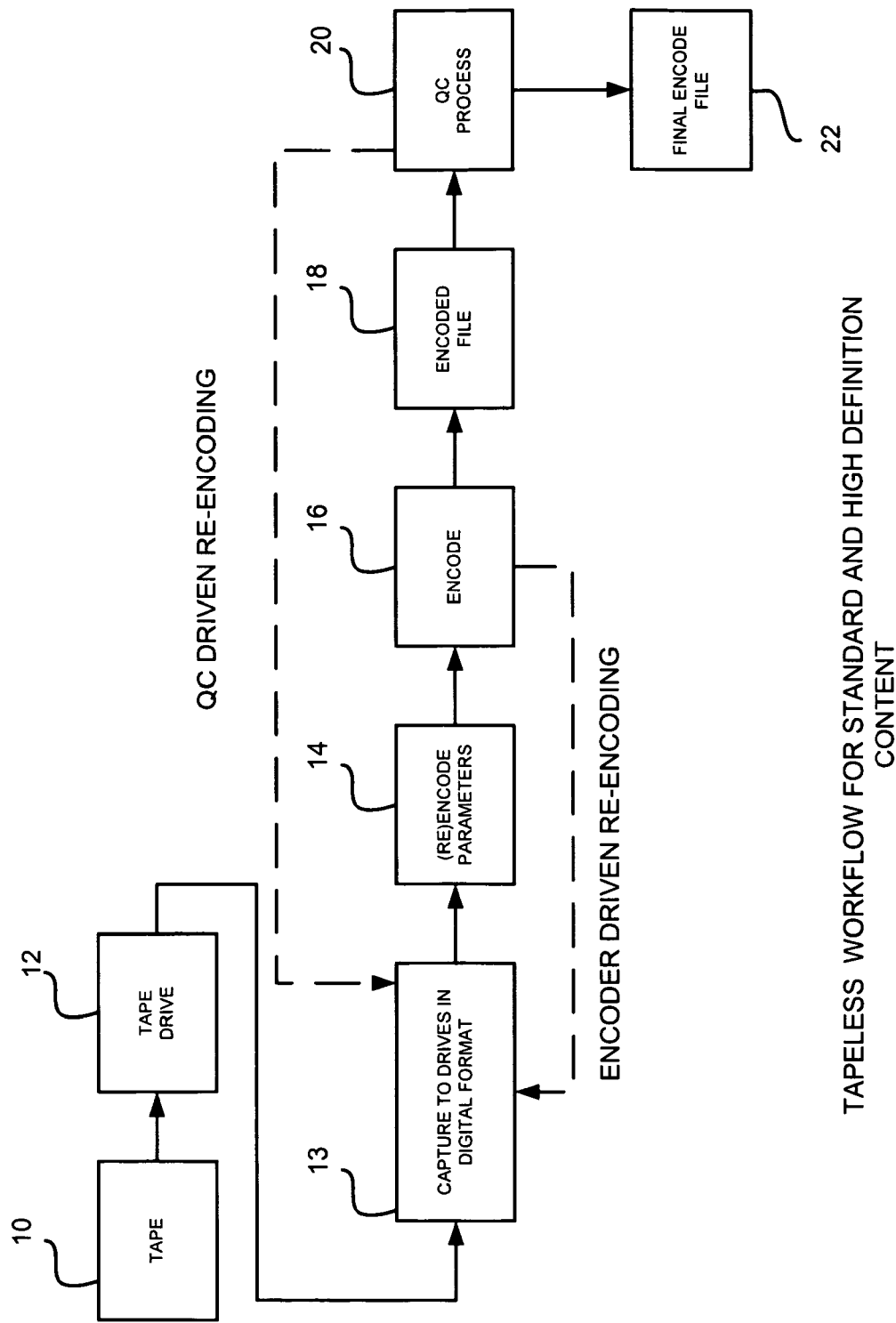
FIG. 2 illustrates a tapeless workflow for encoding video according to an aspect of the present disclosure.

A system and method for encoding video are provided. The system and method of the present disclosure provides for re-encoding with versioning to allow for control, organization of scenes/shots and presentation of re-encoding history during the re-encoding process all of which is necessary during all quality improvement re-encoding work. Referring to FIG. 2, a tapeless workflow for encoding a video in accordance with the present disclosure is illustrated. In the workflow of FIG. 2, a video tape is played via a tape drive and is captured and converted to digital format 13. After the content is captured and converted to digital format, it becomes easy to deal with in a complete digital workflow (e.g., on a computer). All the image filters are either software driven or performed with specialized hardware acceleration. This allows a compressionist or video quality engineer to easily apply the fixes to the video content using dedicated software or hardware. As will be described below, the system of the present disclosure will have dedicated software and/or hardware to allow a user, e.g., a compressionist or video quality engineer, to select particular shot/scene(s) or particular in/out frames for re-encoding; allow a user to specify the re-encoding parameters applied; and allow playback of the content using an integrated video player. The system and method will allow for multiple iterations of re-encoding and making granular improvements possible. The system and method of the present disclosure may save every iteration and compile a history of fixes thus allowing comparison between multiple re-encoding (fixes), encoding and its source. Furthermore, the system and method includes a library of preset fixes, e.g., user-generated sets of encoding parameters, to considerably reduce the time to carry out the fixes.

Figure 3:
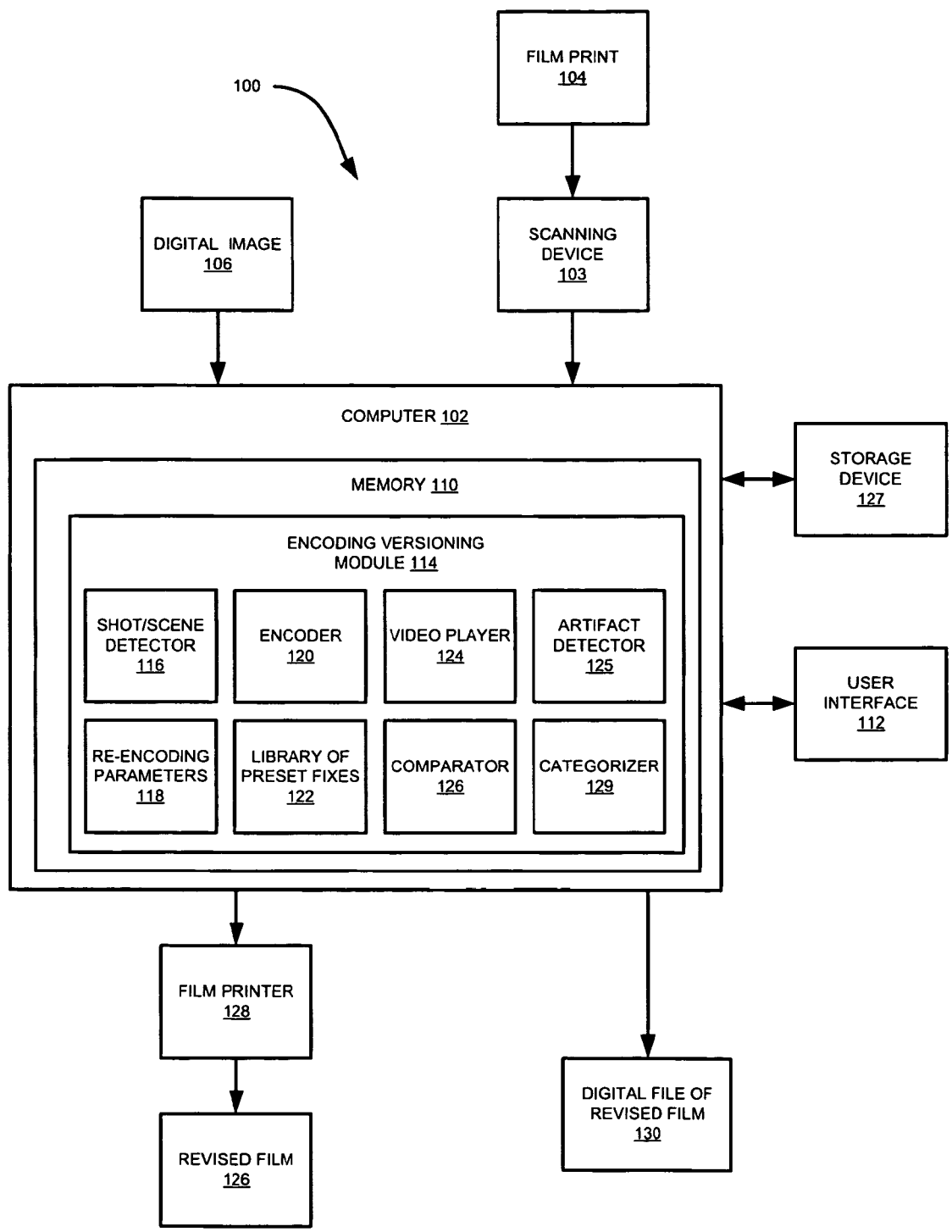
FIG. 3 is an exemplary illustration of a system for encoding video according to an aspect of the present disclosure.

Referring now to the Figures, an exemplary system 100 according to an embodiment of the present disclosure is shown in FIG. 3. A scanning device 103 may be provided for scanning film prints 104, e.g., camera-original film negatives, into a digital format, e.g. Cineon-format or SMPTE DPX files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 127 and a printer 128. The printer 128 may be employed for printing a revised version of the film 126, e.g., a re-encoded version of the film, wherein a scene or a plurality of scenes may have been altered or fixed as a result of the techniques described below.

Alternatively, files/film prints already in computer-readable form 106 (e.g., digital cinema, which for example, may be stored on external hard drive 127) may be directly input into the computer 102. Note that the term "film" used herein may refer to either film prints or digital cinema.

A software program includes an encoding versioning module 114 stored in the memory 110 for encoding/re-encoding video. The encoding versioning module 114 will include various modules that interact to perform the various functions and features provided in the present disclosure. The encoding versioning module 114 includes a shot/scene detector 116 configured to determine at least one shot or scene of a video, e.g., a film or movie. The encoding module 114 further includes re-encoding parameters 118 configured for selecting and applying encoding/re-coding parameters to the detected shot/scene(s). Exemplary re-encoding parameters include DeltaRate to change the bitrate of the particular shot/scene, a Deblocking Filter to remove blocking artifacts from the shot/scene, etc. An encoder 120 is provided for encoding the ingested video into at least one digital format. Exemplary encoders include MPEG-4(H.264), MPEG-2, QuickTime, etc. The encoding versioning module 114 will assign a version number or indication to each version of the video that is encoded.

A library of preset fixes 122 is provided for applying at least one or more fixes to a video shot or scene based on a given condition. The library of preset fixes 122 is a collection of re-encoding parameters to resolve certain artifacts. A user can apply a certain preset by first selecting a shot/scene and then selecting an existing already created preset based on an artifact found in the shot/scene. Presets can also be applied on a user created category basis. Moreover, these presets would be saved for later use across similar video encoding projects when necessary.

The encoding versioning module 114 further includes a video player 124 for decoding the video shot/scene and visualizing the video to a user. A comparator 126 is provided for comparing data of at least two videos of the same shot/scenes and for displaying the comparison data to a user.

Additionally, the encoding versioning module 114 includes an artifact detector 125 for detecting video artifacts in shot/scene(s) of video via a plurality of encoding artifact detection algorithms or functions. Exemplary detectors will detect artifacts such as dark-noise, banding, and also combine detectors based on both dark-noise and banding are also contemplated. The artifact detector 125 will also determine a severity for the artifact detected and assign a value of the severity to the artifact. A categorizer 129 is provided for categorizing detected artifacts. The categorizer 129 will group shot/scene(s) based on a type of artifact in the shot/scene or based on the severity of the artifact detected and a threshold set by the user or the system.

Figure 4:
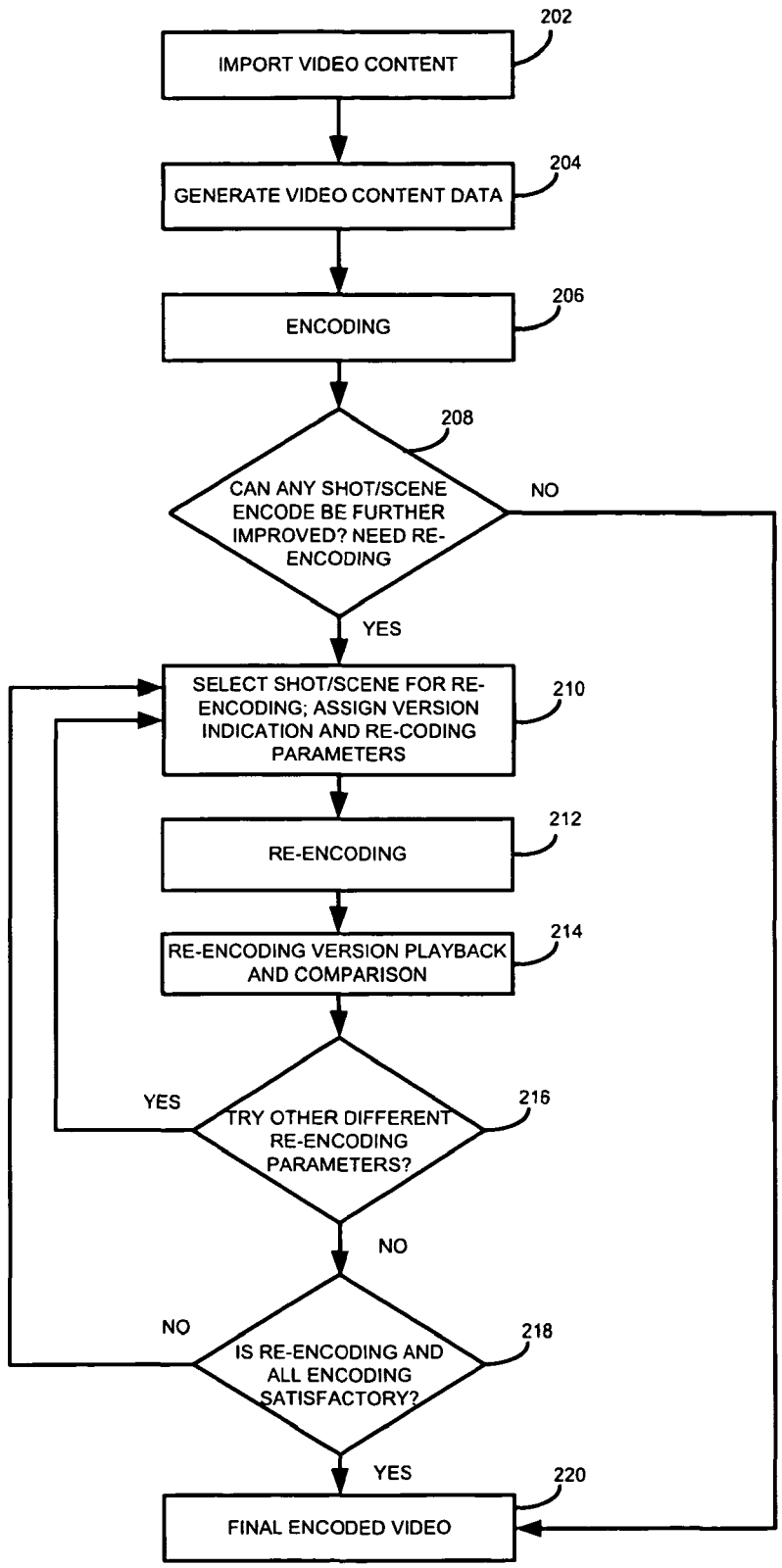
FIG. 4 is a flow diagram of an exemplary method for encoding video according to an aspect of the present disclosure.

FIG. 4 is a flow diagram of an exemplary method for encoding video according to an aspect of the present disclosure. Initially, the post-processing device 102 acquires or imports video content (step 202). The post-processing device 102 may acquire the video content by obtaining the digital master image file in a computer-readable format. The digital video file may be acquired by capturing a temporal sequence of moving images with a digital camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital image file will include one image, e.g., $I_1$, $I_2, \ldots I_n$.

After the video is imported, the video is ingested and video content data is generated (step 204). This step is introduced to prepare the video data coming from different sources into an encoder acceptable format, e.g., from a 10-bit DPX format to an 8-bit YUV format. This may require dropping the bit depth of the images as necessary, save additional color metadata information that could be used within the encoding process, etc. From the ingested video, several algorithms or functions are applied to the video to derive content data, e.g., metadata. For example, scene/shot detection algorithms are applied via the shot/scene detector 116 to segment the complete video into scene/shots; fade/dissolve detection algorithms may also be used. Further content data generated includes histograms, classification based on colors, similar scene detection, bit rate, frame-classification, thumbnails, etc.

Next, in step 206, the video is encoded by encoder 12. The first encode makes the Version 0 or the base/reference encode version. All the other versions will be compared to this version for video quality improvements as necessary or between a version of a respective shot/scene.

In step 208, it is determined whether any shot/scene encode can be further improved or needs recoding. The quality of the video shot/scenes can be improved automatically during the first encode. A compressionist can visually inspect the shot/scene to determine if further re-encoding is necessary. If it is determined, no further re-encoding is necessary, the final encoded video will be output at step 220. Otherwise, if further re-encoding is necessary, the method will continue to step 210 either by applying presets or individual re-encoding parameter.

In step 210, a shot/scene will be selected by a user, automatically assigned a version number or indication and new re-encoding parameters will be assigned or selected from a list of re-encoding parameters 118. Alternatively, a user or compressionist may select from a library of preset fixes 122 which may include one or more re-coding parameters. It is to be appreciated that the user may select a frame or frames within a shot/scene for the re-encoding process.

Re-encoding on the selected shot/scene is then performed (step 212) and the re-encoded version is then played back via video player 124 and compared to previous versions of the selected shot/scene(s) (step 214) via comparator 126 for verifying video or re-encoding quality. In one embodiment, the re-encoded version and the previous version will be visually compared by displaying these videos in a split screen via the video player 124. Comparison data (or metadata) such as average bit-rate levels, encode frame types, peak-signal-to-noise ratios, etc. could also be compared simply by selecting/checking the particular version and visually differentiating data for that shot/scene versions, as will be described below in relation to FIGS. 6 and 7. At all times one version of each shot/scene is selected for continuity. Other comparison data may be displayed such as a listing of video artifacts detected in the encoded and re-encoded version of video, a video file size and the particular encoding parameters employed for a selected version.

After the re-encoding is performed based on the re-encoding parameters selected in step 210, it is determined if the re-encoding for the shot/scene is satisfactory or if other different re-encoding parameters should be applied (step 216). This determination is a visual/manual process using split video or visualizing the comparison data. In one embodiment, the user or compressionist will select one of several generated versions that is relatively free of artifacts as a final version of the encoded video based on visualization of the comparison data, e.g., the peak-signal-to-noise ratio. In other embodiment, the user or compressionist will select one of the several generated versions that is relatively free of artifacts as a final version of the encoded video based on a split visualization of at least two selected versions by the video player 124. If the re-encoding for the shot/scene is not satisfactory, the process will revert back to step 210 and other re-encoding parameters will be applied. Otherwise, the process will go to step 218.

In step 218, it is then determined if the encoding and re-encoding is satisfactory for all the shot/scenes associated with a complete video clip or movie. If there are further shot/scenes to be re-encoding, the process will revert to step 210 and another shot/scene will be selected. Otherwise, if the encoding and re-encoding is satisfactory for all shot/scenes, the final encoded video is stored, e.g., in storage device 127, and may be retrieved for playback (step 220). Furthermore, shots/scenes of a motion picture or video clip can be stored in a single digital file 130 representing a complete version of the motion picture or clip. The digital file 130 may be stored in storage device 127 for later retrieval, e.g., to print a tape or film version of the encoded video.

FIGS. 5-10 illustrate several exemplary screen shots for controlling the re-encoding of the video and for applying at least one re-encoding parameter to the video according to an aspect of the present disclosure.

Figure 5:
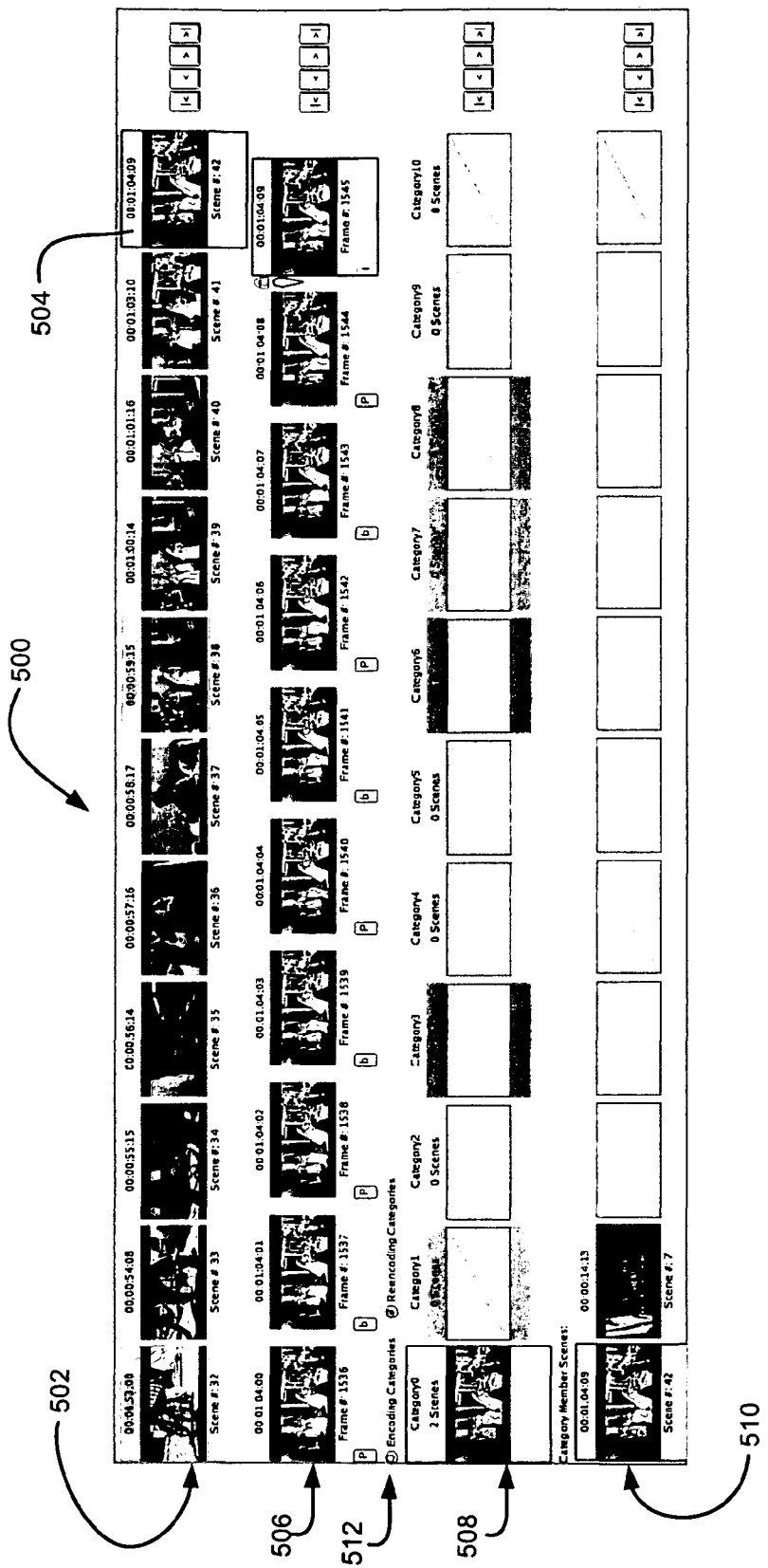
FIG. 5 illustrates an exemplary screen shot for selecting a shot/scene of a video to be re-coded according to an aspect of the present disclosure.

Referring to FIG. 5, a first representation to select particular shot/scene(s) for re-encoding is illustrated. An interface 500 is provided that shows part of a thumbnail representation of the entire feature with shot/scene detection already performed on it. The thumbnails can be selected to mark-in (e.g., the beginning) and mark-out (e.g., the end) regions for re-encoding. These selections can be performed at scene level or frame level and determine the particular region for re-encoding. In FIG. 5, the detected shot/scenes of the video are represented by thumbnails 502. Upon selecting a particular shot/scene thumbnail 504, the frames associated with the selected shot/scene are displayed as thumbnails 506 to the user.

The interface 500 includes a section 508 for adding shots for re-encoding by drag and drop into a re-encoding category or using a context menu by clicking on the thumbnails themselves. The scenes 502 can simply be dropped within the user defined colored categories 508. In one embodiment, the colors of the category will signify video artifacts, complexity, shot/scene flashes, etc. The interface 500 also includes a section 510 which shows the individual scene(s) belonging in the above selected category 508. These thumbnails show the first frame of the shot/scenes that belong within the selected/highlighted category.

Figure 6:
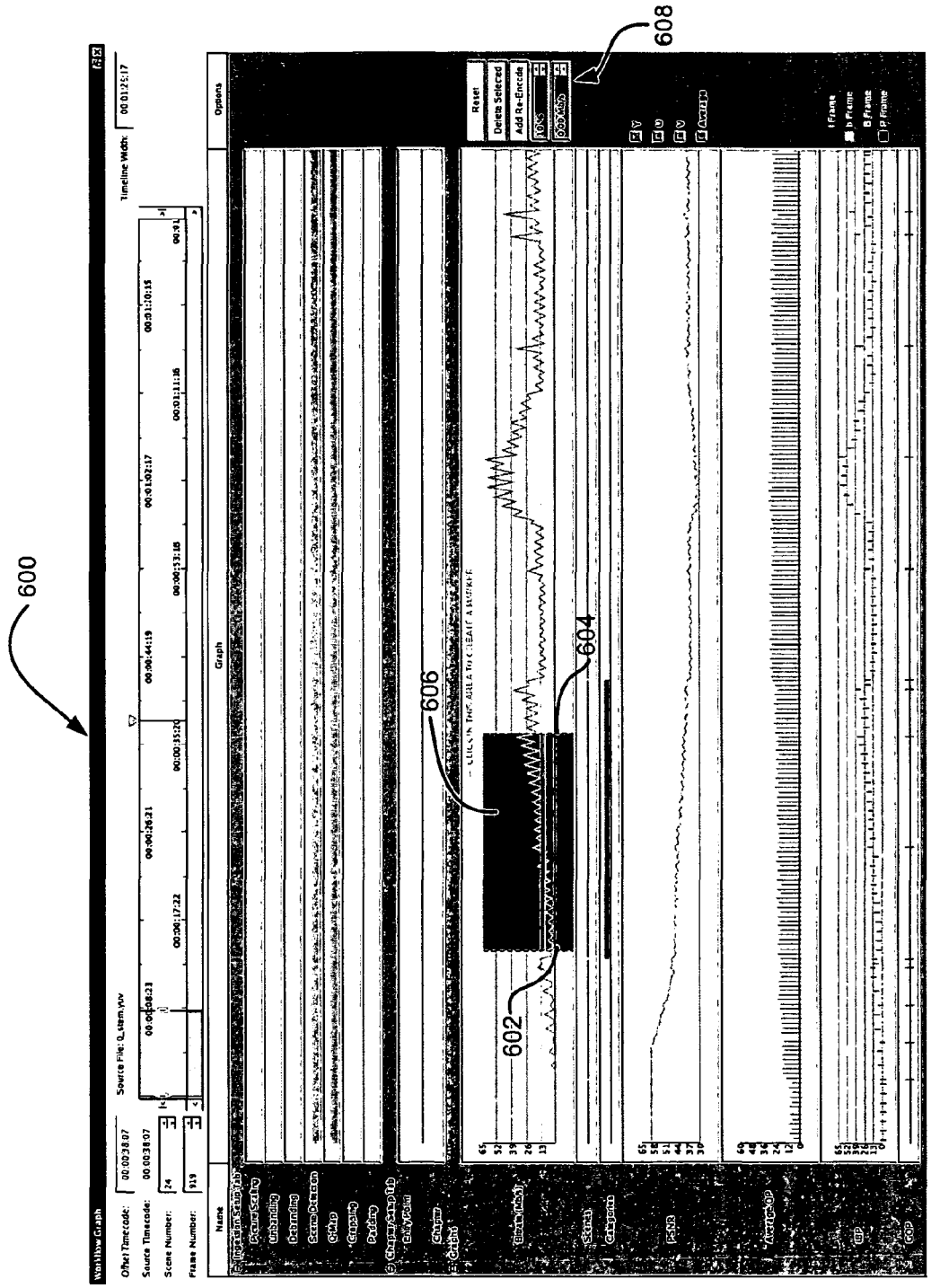
FIG. 6 illustrates another exemplary screen shot for selecting a shot/scene of a video to be re-coded according to another aspect of the present disclosure.

Referring to FIG. 6, a second representation to select particular shot/scene(s) at a frame level for re-encoding is illustrated. Another interface 600 is provided that represents additional properties or metadata of the (re)encoded video stream. For example, a bit rate graph could be used to mark-in and mark-out the region that requires quality enhancement based on encoded stream properties. Here, mark-in/mark-out is represented by flags 602, 604 and a shaded area 606. Section 608 is provided for applying additional parameters for re-encoding before adding for re-encoding.

FIGS. 7-10 illustrate several exemplary screen shots for enabling a compressionist or video quality engineer to control the re-encoding of the video and to apply at least one re-encoding parameter to the video and to allow the compressionist or video quality engineer to pick a version of a re-encoding that is relatively free of video artifacts according to an aspect of the present disclosure. According to various aspects of the present disclosure, the compressionist or video quality engineer can provide multiple additional re-encoding parameters being applied at a more granule level down to individual frames within same scene.

Figure 7:
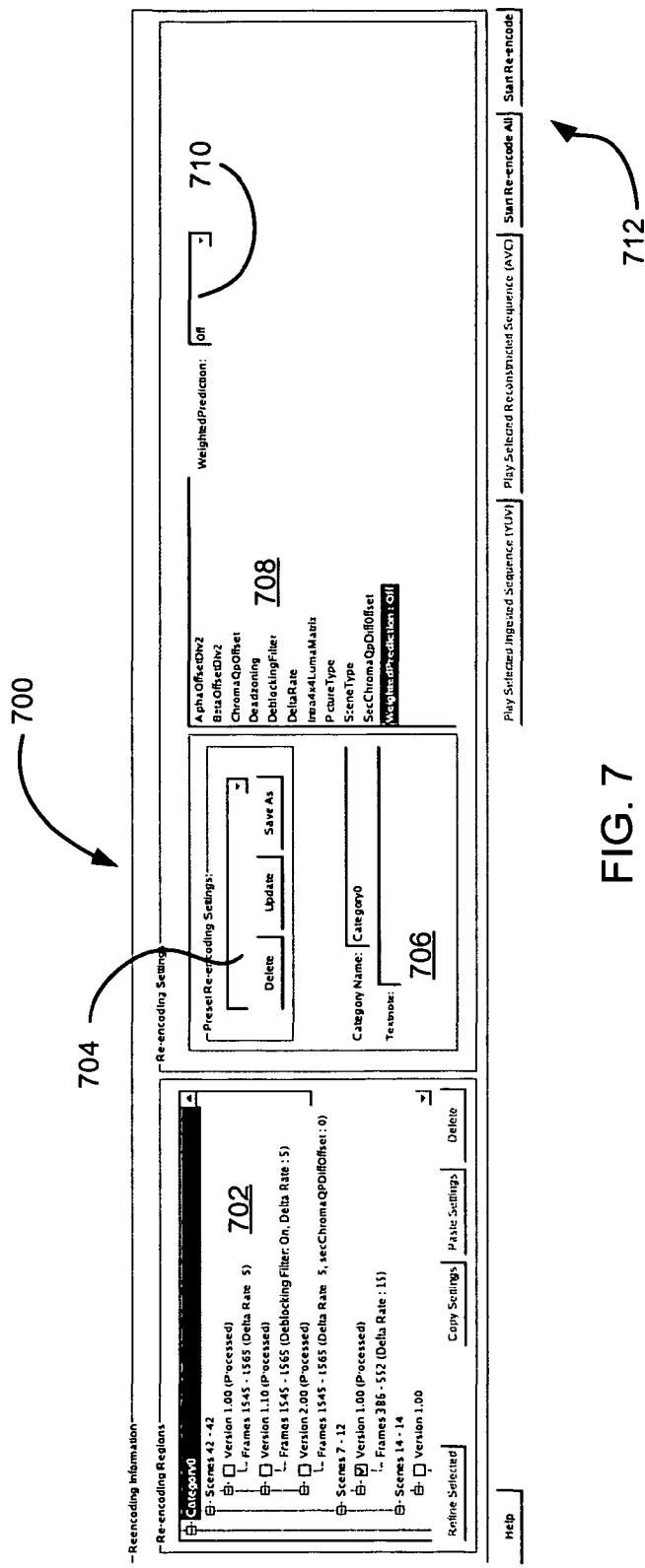
FIGS. 7-10 illustrate several exemplary screen shots for controlling the re-encoding of the video, controlling the versioning of re-encoding of the video, and for applying at least one re-encoding parameter to the video according to an aspect of the present disclosure.

FIG. 7 shows an interface 700 for selecting additional re-encoding setup properties at the category level. Section 702 shows a tree like list containing re-encoding regions requested by the user using the above selection components, e.g., a shot/scene or frame as described in relation to FIGS. 5 and 6. The tree includes: 1.) Categories—grouping that re-encoding scene is part, i.e., it allows similar re-encoding property to be applied to all scenes that are part of it; 2.) range of scenes numbers—includes the start and end scenes that re-encoding is part; 3.) version—the version of re-encoding being performed with progress status information (the check box provides a way to select the version that compressionist seems fit or resolves all the video artifact); and 4.) frame range—where the re-encoding properties are being applied. In this manner, the user interface 700 will display a history of versions indication for a shot/scene or frames. Section 704 shows a list of presets that are developed over time to resolve common re-encoding issues, e.g., the library of preset fixes 122. These presets serve as a re-encoding toolkit that could be used or shared with other compressionist/users to expedite issues. Section 706 illustrates the category name which could be assigned and additional textual data that could be associated with the category to make better sense of the purpose that the category serves. Section 708 illustrates a list of re-encoding parameter names that could be applied to resolve the video artifacts. The filters or re-encoding parameters shown in section 708 belong to the preset selected in section 704 and the list will change as different presets are selected. Section 710 is where the user would select the strength of the re-encoding parameter being applied. Section 712 includes buttons to start selected re-encoding or start all for re-encoding that have not been done so far.

Using the interfaces 600, 700 of FIGS. 6 and 7, re-encoding on the shot/scene selected in section 702 is then performed (as described in step 212 above) and the re-encoded version is then played back via video player 124 and compared to previous versions of the selected shot/scene(s) (as described in step 214 above) via comparator 126 for verifying video or re-encoding quality. In one embodiment, the re-encoded version and the previous version will be visually compared by displaying these videos in a split screen via the video player 124. In a further embodiment, comparison data (also known as metadata) such as average bit-rate levels, encode frame types, peak-signal-to-noise ratios (PSNRs), etc could also be compared simply by selecting/checking the particular version 702 and visually differentiating data in the shaded section 606 of FIG. 6 for that shot/scene versions, where the interface 600 would act as comparator 126. Here, by selecting between versions of video, the interface 600 will toggle between the metadata for each version for visual inspection by a user or compressionist. For example, a user could toggle between two different versions of the video to observe the PSNR data for each video where the higher the PSNR the better the video quality.

Figure 8:
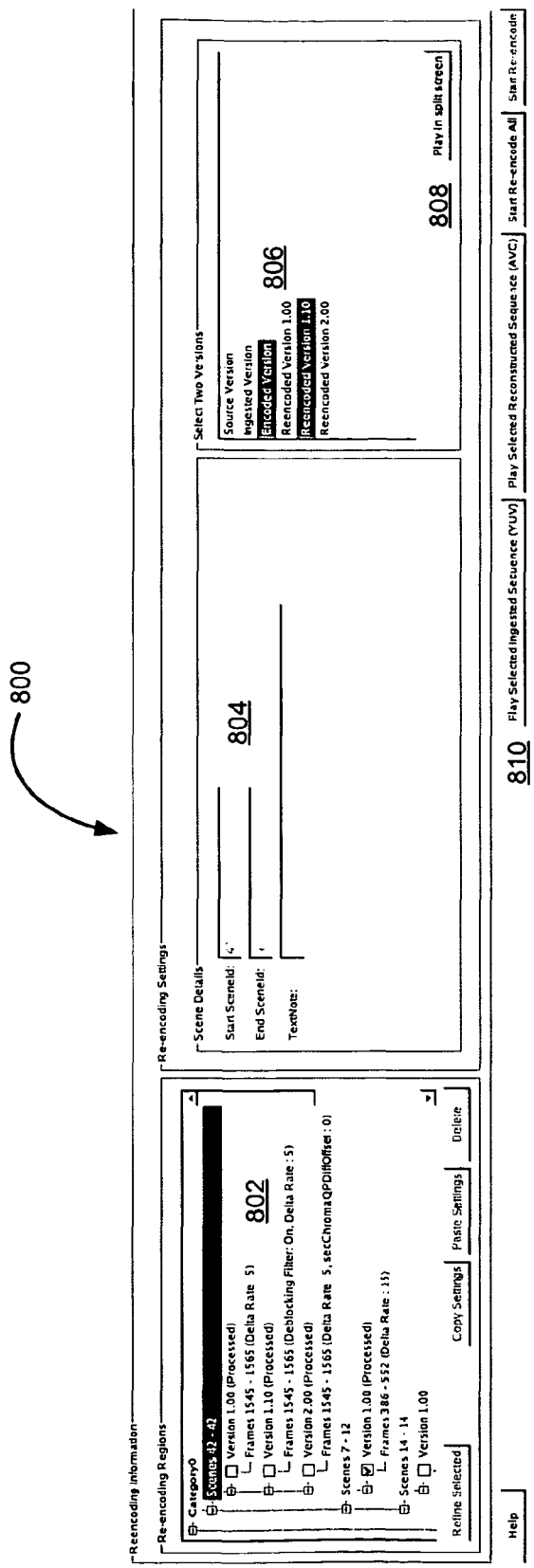

FIG. 8 shows an interface 800 for selecting additional re-encoding setup properties at the scene level. In section 802, the scene level node is selected. It shows the scene number for the scene that is being re-encoded. Section 804 illustrates the region to associate textual data regarding the scene being re-encoded. Section 806 provides a list of all the options to select and compare between different phases or versions of the particular scene. This list includes:

Source Version—This is the actual source of the scene

Ingested Version—This is the ingested version of the scene

Encoded Version—This is the first encoded version of the scene

Re-encode Version X.YY—These are the re-encodes requested by the compressionist. X.YY shows the generation and history of the re-encodes. X is the major version whereas YY shows the minor version. Using the X.YY version indication, the user can figure out the progression of re-encodes. For example, one representation of the versioning mythology could be as follows:

Version 1.00—first attempt of re-encoding with certain re-encoding parameter(s).

Version 1.10—second attempt of re-encoding with above parameters with some additional or further refinements. Version 1.00 being the parent, providing the actual set of parameters to begin re-encode.

Version 1.11—attempt to further refine Version 1.10 with some additional parameters.

Version 2.00—fresh attempt of re-encoding with different set of re-encoding parameter(s).

The above example also show how the user can deduce the progression of re-encoding that follows to improve the quality of encodes. This allows a user to better understand the re-encoding process and narrow down to quality encodes quickly by trying out different sets of re-encoding for the same scene simultaneously, thereby, improving compressionist productivity and improving quality. Selecting any two of the versions would allow the compressionist to compare the re-encoded version together using a split-screen integrated video player 124. This way quality improvements between versions can be easily spotted and selected thus improving the final encoded video stream.

Referring back to FIG. 8, section 808 provides a button that launches the video player in split-screen mode comparing the two-version selected in Section 806. Buttons provided in section 810 launches the video player in full-screen mode playing either the selected scene's ingested or the re-encoded video stream.

Figure 9:
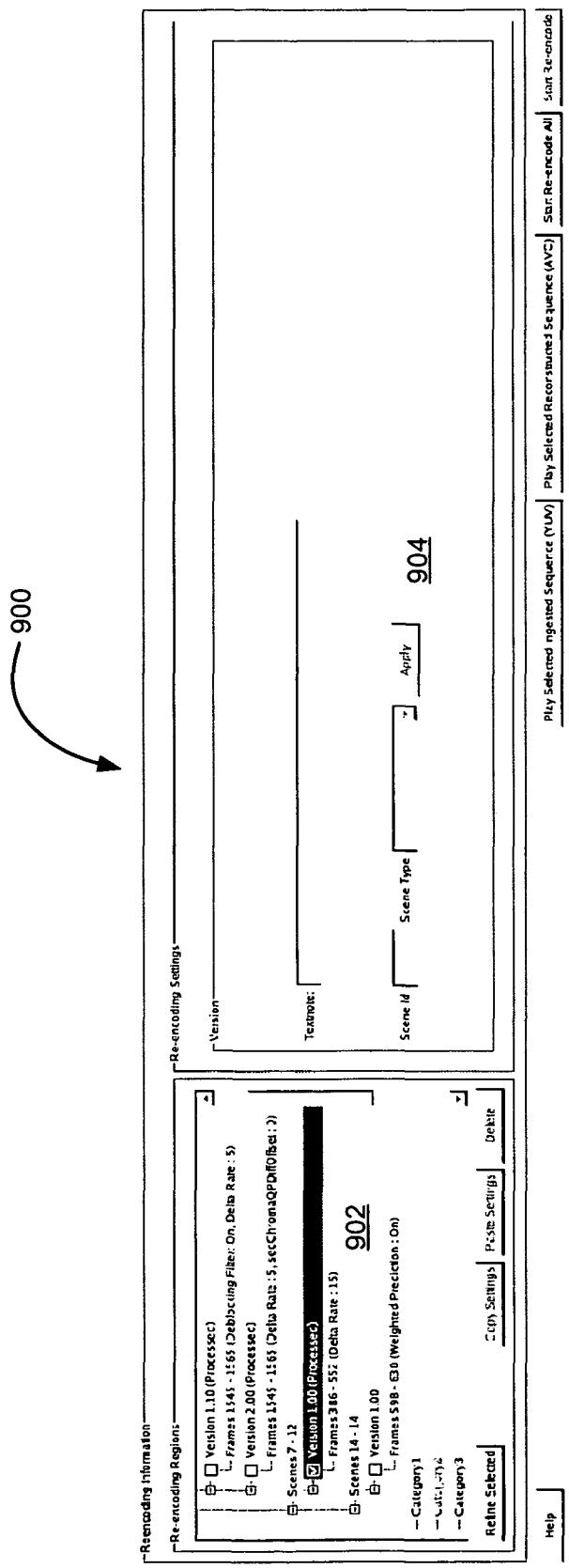

FIG. 9 illustrates an interface 900 for selecting additional re-encoding setup properties at the version level. Section 902 provides a list of the version for various shot/scenes, e.g., Version X.YY. These are the re-encodes requested by the cornpressionist. X.YY shows the generation and history of the re-encodes. X is the major version whereas YY. shows the minor version. Using the X.YY, the user can figure out the progression of re-encodes. Section 904 of FIG. 9 allows a user to associate additional textual data with the version selected.

Figure 10:
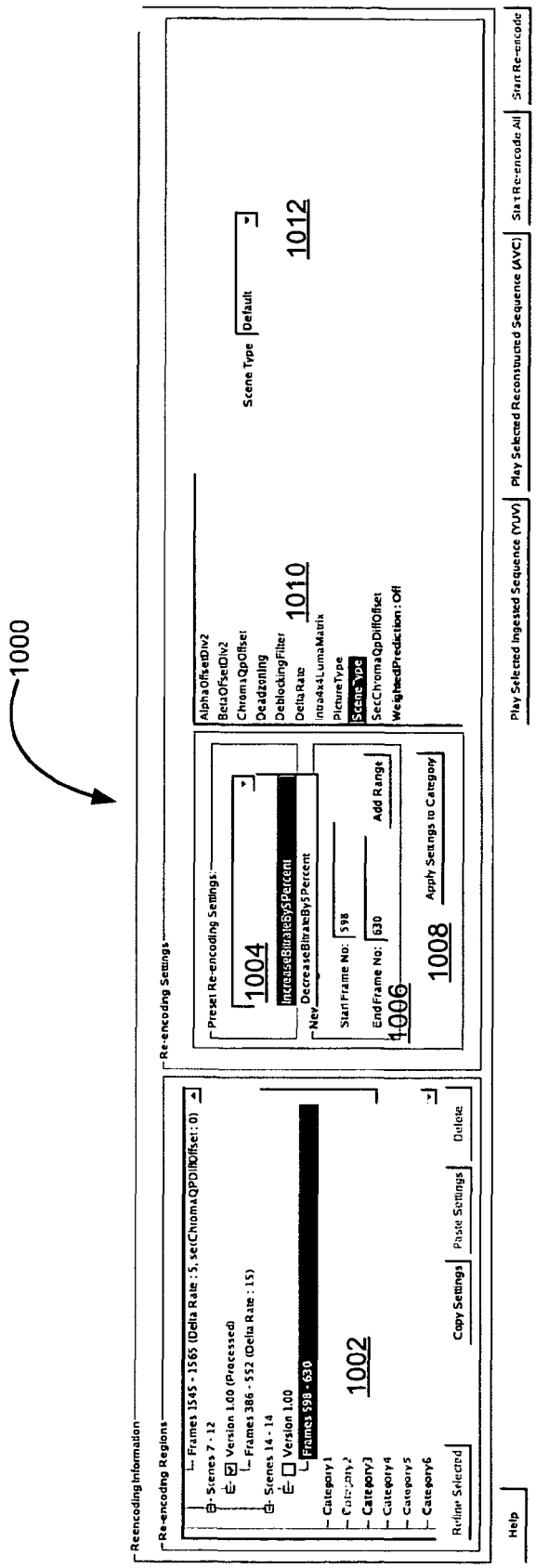

FIG. 10 shows an interface 1000 for selecting additional re-encoding setup properties at the frame range level. Section 1002 shows the frame numbers that would be re-encoded with the particular scene selected. This selection is determined using one of the above representation of selecting shot/scene (s) for re-encoding as described in relation to FIGS. 5 and 6. Section 1004 shows a list of preset(s) that are developed overtime and can be used to apply to frames to resolve common re-encoding artifacts, e.g., the library of preset fixes 122. These presets can be shared with other users. Section 1006 allows a user to add additional frame ranges. This enables the compressionist to customize and apply different re-encoding parameters to certain frames within the original selected range selection. Section 1008 enables a user to apply (copy) the present selected set of re-encoding parameters to a category level. This way a compressionist can easily apply a tested version of fixes to the entire category of similar problem shots/scenes. Section 1010 provides a list of re-encoding parameters that can be applied to the frame range level and Section 1012 enables a compressionist to select a scene type. A compressionist can select or alter the strength of the re-encoding parameters.

Figure 11:
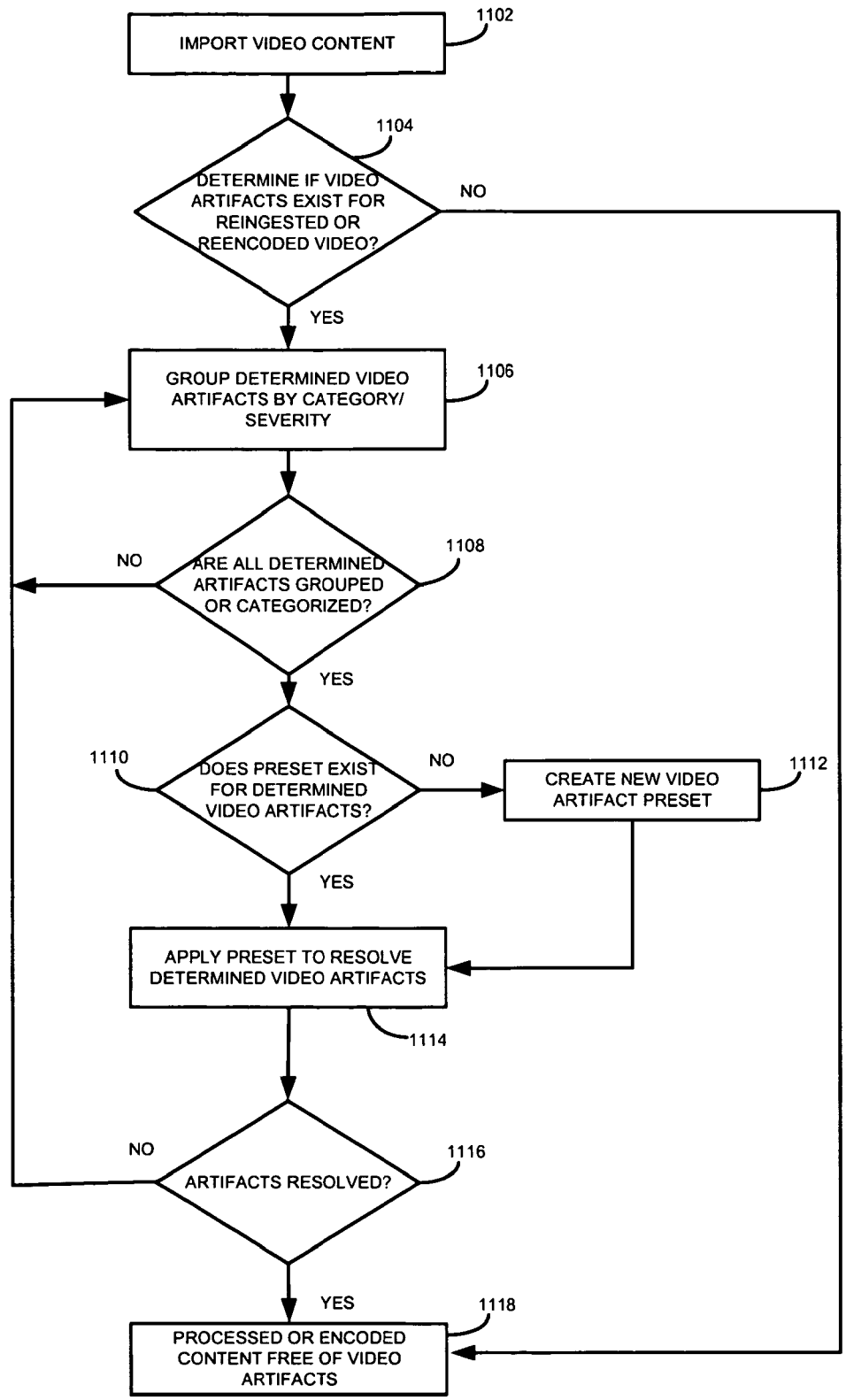
FIG. 11 is a flow diagram of an exemplary method for creating and applying presets of re-encoding parameters to video content for reducing artifacts.

Referring to FIG. 11, a method for creating and applying a user-generated set or preset of encoding parameters is illustrated. Initially, in step 1102, video content is imported as described above in relation to FIG. 4. Next, the artifact detector 125 determines if video artifacts exist in the video content, in step 1104. If no artifacts exist in the video content and the encoding and re-encoding is satisfactory for all shot/scenes, the final encoded video free of video artifacts is stored, e.g., in storage device 127, and may be retrieved for playback (step 1118). Otherwise, the shot/scene(s) are grouped by the category/severity of the determined artifacts, in step 1106. The grouping of the shot/scene(s) can be manual as described above in relation to FIG. 5 or can be automatic as will be described below in relation to FIG. 13. In step 1108, it is determined if all artifacts are grouped or categorized and, if not, the method reverts to step 1106 to attempt to categorize the remaining artifacts or create a new category for the remaining artifacts.

Figure 12:
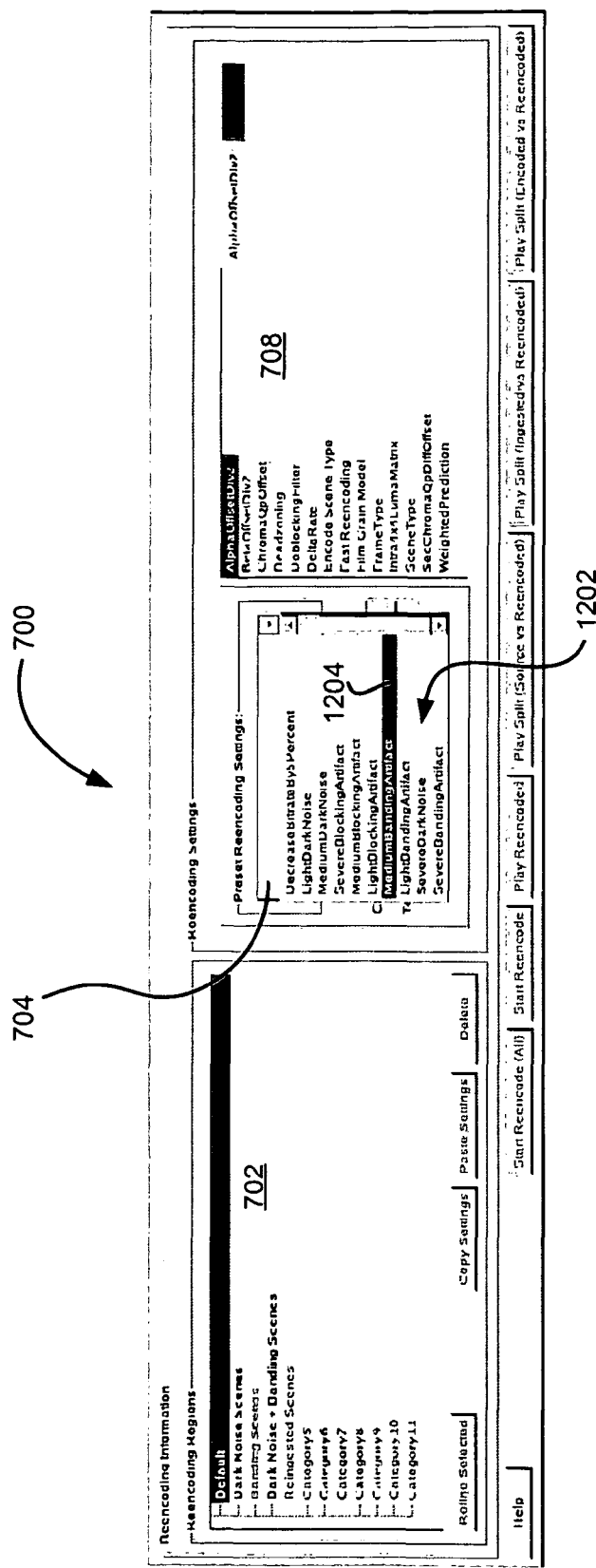
FIG. 12 illustrates an interface for selecting a preset of re-encoding parameters to be applied to a particular category of artifacts contained in video content.

Once the artifacts are grouped or categorized, it is determined if a preset of re-encoding parameters exist for a particular group or category of artifacts, in step 1110. Referring to FIG. 12, another view of interface 700 is illustrated to demonstrate how a user or compressionist can select from a category of artifacts and applying a preset for that category. As described above, a user or compressionist can review the existing presets in section 704. Here, a list 1202 of presets that are stored in the library of preset fixes 122 is display as a drop down menu from section 704. Depending on user experience, visual or analytical (metadata) FIG. 6 confirmation of the categorized shots/scenes, the compressionist may select a strength of presets based on light, medium, or severe artifact (or any other strength category), e.g., LightBlockingArtifact, MediumBlockingArtifact or SevereBlockingArtifact as shown in list 1202. The compressionist may also further use a particular preset as a starting point and adjust the applied preset appropriately to significantly reduce the appearance of the artifact and improve the quality of the video. If it is determined that an existing preset can be used, the user will select the category to be fixed in section 702, e.g., Dark Noise Scenes, Banding Scenes, Dark Noise+Banding Scenes, etc., and then select and apply the appropriate preset from the list 1202 provided in section 704 (step 1114). In the example shown in FIG. 12, the preset MediumBandingArtifact 1204 has been selected and the re-encoding parameters associated with the selected preset 1204 are listed in section 708.

If a preset for a particular grouping or category does not exits, the user can create a new video artifact preset, in step 1112. In section 706 of FIG. 7, a category name can be assigned and additional textual data could be associated with the new preset. In section 708, a user will select from a list of re-encoding parameters that will be assigned to the newly created preset.

In step 1116, it is determined if the artifacts are resolved. If no artifacts exist in the video content and the encoding and re-encoding is satisfactory for all shot/scenes, the final encoded video free of video artifacts is stored, e.g., in storage device 127, and may be retrieved for playback (step 1118). Otherwise, the method reverts back to step 1106 to attempt to categorize and resolve any remaining artifacts.

Figure 13:
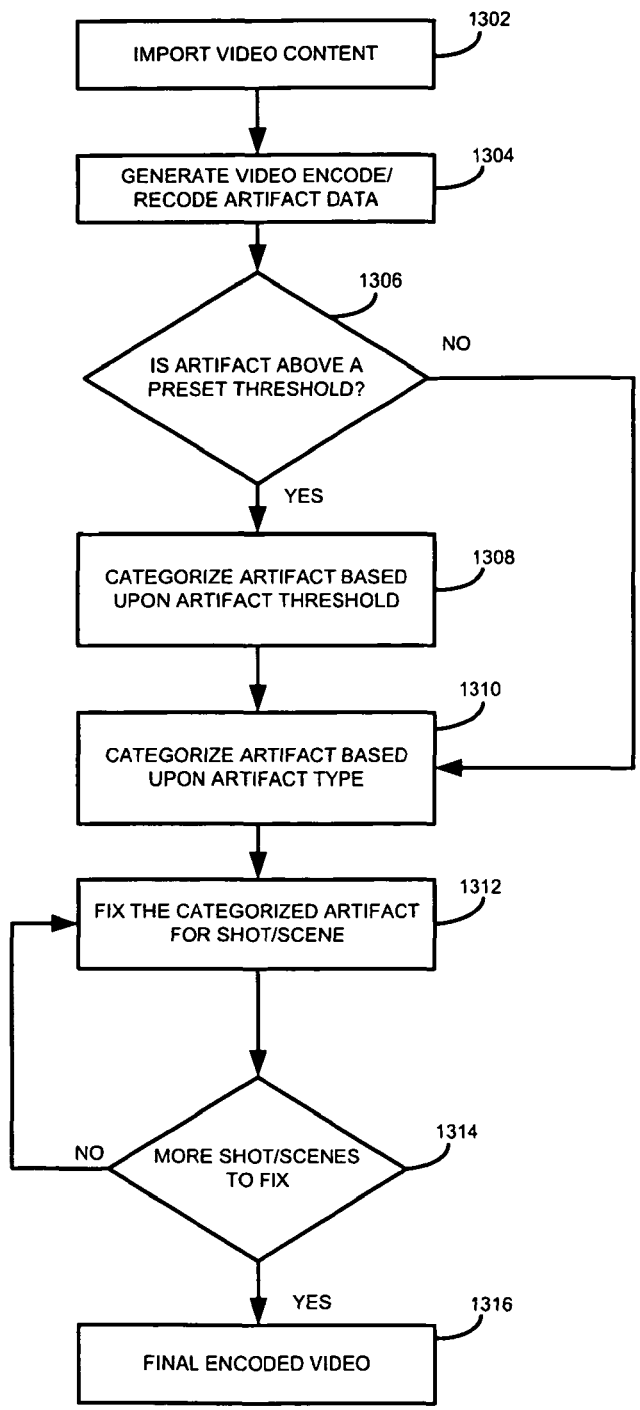
FIG. 13 is a flow diagram of an exemplary method for identifying and categorizing artifacts according to an aspect of the present discourse.

Now with reference to FIG. 13, a method for categorizing artifacts will be described. Initially, in step 1302, video content is imported as described above in relation to FIG. 4. Then, in step 1304, video encode/re-encode artifact data is generated. During the encoding process, the digital video content is passed though a series of encoding artifacts detection algorithms or functions via the artifact detector 125. These artifact detection algorithms or functions specialize in finding the most prominent video artifacts found in High-Definition Video encoding, e.g., banding, dark-noise, or having both banding & dark-noise. After these artifacts algorithms or functions have been completely run on the entire encoding/encoded video, a range of values are assigned to the artifacts found in the encoded shot/scenes based on the severity of artifacts found. These can be values quantifying the significance of the existence of the artifact. At this point, the system 100 can determine the extent of the artifact relative to a threshold value set for the artifact, weight relative to other types of artifacts, and then categorize them appropriately into predefined categories for further visual improvement and interpretation based on the severity of the artifact, e.g., light, medium or severe dark-noise artifact. Although one shot/scene may only belong to one artifact category for simplicity and continuity of the video content, i.e., a specific artifact category such as banding, the shot/scene may contain several types of artifacts. In other words, significance of one artifact may dwarf other artifacts in a shot/scene when considering categorization. Alternatively, a shot/scene may be categorized under a category supporting multiple artifacts which are logically grouped together, for example, based on a preset of fixes or some other user-defined parameter.

In step 1306, it is determined if the artifact values for a selected shot/scene are above a predetermined threshold. If the artifact values for the particular shot/scene are below the predetermined threshold, the artifacts will be categorized by type in step 1310. Otherwise, the artifacts will first be categorized based upon the artifact threshold, in step 1308, and then by artifact type, in step 1310. Based on the above categorization rules, shots/scenes are automatically categorized for user attention and displayed in the appropriate category of section 508 of FIG. 5. It is to be appreciated that the compressionist may also append to these artifact categories manually the shots/scenes that fit the logical category description. Furthermore, once the shot/scenes are categorized, interface 500 of FIG. 5 will allow the compressionist to easily switch between categories of different workflows, e.g., encoding, re-encoding, etc., by selecting the appropriate radio button in section 512.

It is to be appreciated that the categorizer 129, in step 1308, may consider threshold values literally and may flag the shots/scenes for categorization by categorizing the shot/scene based on the single most severe artifacts, e.g., banding. However, depending on possibility of shots/scenes having multiple artifacts with different levels of severity and weightage, the categorizer 129 may, in certain embodiments, consider the significance of all data before final categorization based on the artifact. For example, the categorization of step 1308 could also be based on a percentage of total artifact severity such as the top 5% of worst scenes with dark noise and banding within the video content, allowing the compressionist to quickly narrow and improve the quality if deem necessary.

Once the artifacts are grouped or categorized, the shot/scene is fixed or re-encoded in step 1312. The re-encoding can be accomplished by selecting a preset as described above in relation to FIG. 11 or selecting a single re-encoding parameter. In step 1314, it is determined if there are remaining shot/scene(s) to be fixed or re-encoded. If the encoding and re-encoding is satisfactory for all shot/scenes, the final encoded video free of video artifacts is stored, e.g., in storage device 127, and may be retrieved for playback (step 1316). Otherwise, the method reverts back to step 1312 to attempt to categorize and resolve any remaining artifacts.

A system and method for re-encoding video with versioning has been described. The system and method is simple and intuitive to implement and understand; improves and increases control over the encoding and re-encoding process and allows incremental video quality improvements/enhancements, insight and provides history regarding the re-encoding fixes. Furthermore, the system and method allows a user to save and develop library/knowledgebase overtime, and enables reusability across multiple encoding jobs or with other users for quick throughput; and provides an understanding of the effects of digital workflow/tools processes better (ingestion, filtering, encoding, or, re-encoding), and of comparing and troubleshooting quality issues/artifacts within compressed video outputs. Additionally, the system and method of the present disclosure reduces user/man-hours required to complete a fixed feature encoding and results in increased productivity and throughput.

Although embodiments which incorporate the teachings of the present disclosure have been shown and described in detail herein, those skilled in the art can readily devise many other varied embodiments that still incorporate these teachings. Having described preferred embodiments for a system and method for encoding video and reducing artifacts in the encoded video (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for reducing video artifacts, said method being executed by a processor and comprising:
receiving source video, said source video containing a plurality of frames;
encoding said source video;
detecting at least two different artifacts in a first portion of said plurality of frames of said encoded video, each of the at least two different artifacts being a different type of artifact;
detecting at least the same at least two different artifacts in a second portion of said plurality of frames of said encoded video;
grouping each of the first and second portions of said plurality of frames of said encoded video into a single, user-defined category defining a subset of artifacts including the at least two different artifacts; and
re-encoding each of said first and said second portions of said plurality of frames of said encoded video containing said same at least two different artifacts based on the grouping using a user-generated set of encoding parameters selected from a library of preset sets of encoding parameters associated with the single, user-defined category such that said at least two different artifacts are reduced when the video is re-encoded.

2. The method of claim 1, further comprising determining a severity for each of the at least two artifacts.

3. The method of claim 2, further comprising selecting the user-generated set of encoding parameters based on an artifact from the at least two artifacts having the highest determined severity.

4. The method of claim 1, wherein the user-generated set of encoding parameters is a first user-generated set of encoding parameters and wherein if the first user-generated set of encoding parameters does not remove the at least two artifacts, generating a second user-generated set of encoding parameters, the encoding parameters of the second user-generated set being different than the encoding parameters of the first user-generated set.

5. The method of claim 1, further comprising:
outputting the plurality of video frames of the source video for display in a first portion of a display; and
outputting the each of the first and second portions of said plurality of frames of said encoded video in the single, user-defined category to enable re-encoding for display in a second portion of the display.

6. The method of claim 2, wherein grouping includes grouping the first portion of said plurality of frames into a first category and grouping the second portion of said plurality of frames into a second category based on a severity of at least one artifact of the at least two different artifacts.

7. The method of claim 3 wherein if a value of the severity for a portion of the plurality of frames is greater than a predetermined threshold, outputting the portion having the severity greater than the predetermined threshold for display.

8. A method of enabling the reduction of artifacts in encoded video, the method being executed by a processor and comprising:
receiving source video, said source video having a plurality of frames;
encoding said source video;
determining if a first portion of said plurality of frames of encoded video contains at least two different artifacts, each of the at least two different artifacts being a different type of artifact;
determining if a second portion of said plurality of frames of encoded video contains the same at least two different artifacts;
grouping each of the first portion of said plurality of frames and the second portion of said plurality of frames into a single, user-defined category defining a subset of artifacts including the at least two different artifacts upon determining the first and second portions of said plurality of frames include the at least two different artifacts;
outputting the frames of video grouped into the single, user-defined category for display; and
enabling a user to select a set of encoding parameters from a library of preset sets of encoding parameters associated with the single, user-defined category such that the severity of at least one artifact of the at least two different artifacts is reduced when the group including the first portion of said plurality of frames and the second portion of said plurality of frames of said encoded video are re-encoded.

9. The method of claim 8, further comprising determining a severity for the at least one artifact of the at least two different artifact for said first plurality of frames of encoded video.

10. The method of claim 9, wherein if a value of the severity for a portion of the plurality of frames is greater than a predetermined threshold, outputting the portion having the severity greater than the predetermined threshold for display.

11. The method of claim 8, wherein the set of encoding parameters is a first user-generated set of encoding parameters and wherein if the first set of encoding parameters does not remove the at least two artifacts, enabling the user to select a second set of encoding parameters, the encoding parameters of the second set being different than the encoding parameters of the first set.

12. The method of claim 8, further comprising:
outputting the plurality of video frames of the source video for display in a first portion of a display; and
outputting the each of the first and second portions of said plurality of frames of said encoded video in the single, user-defined category to enable re-encoding for display in a second portion of the display.

13. The method of claim 9, further comprising selecting the user-generated set of encoding parameters based on an artifact from the at least two artifacts having the highest determined severity.

14. The method of claim 9, wherein grouping includes grouping the first portion of said plurality of frames into a first category and grouping the second portion of said plurality of frames into a second category based on a severity of at least one artifact of the at least two different artifacts.

15. A system for encoding video comprising:
an encoder for receiving a source video, said source video having a plurality of frames;
a scene detector for detecting at least a first plurality of frames of said source video and a second plurality of frames of said source video from said plurality of frames;
an artifact detector for detecting at least two different artifacts in said first plurality of frames and said second plurality of frames, each of the at least two different artifacts being a different type of artifact; and
a library of preset sets of encoding parameters, wherein said encoder group each of the first plurality of frames and second plurality of frames into a single, user-defined category defining a subset of artifacts including the at least two different artifacts and re-encodes each of said first plurality of frames and second plurality of frames based on grouping using at least one user-generated set of encoding parameters selected from the library of preset sets of encoding parameters associated with the single, user-defined category such that the severity of said at least two artifacts is reduced when the video is re-encoded.

16. The system of claim 15, further comprising a categorizer for determining a category for the at least two artifacts.

17. The system of claim 16, further comprising a user interface for selecting the at least one user-generated set of encoding parameters based on one of the determined categories.

18. The system of claim 15, wherein the artifact detector determines a severity for each of the at least two artifacts.

19. The system of claim 18, further comprising a user interface for selecting the at least one user-generated set of encoding parameters based on an artifact from the at least two artifacts having the highest determined severity.

20. The system of claim 15, further comprising a user interface for generating at least one second user-generated set of encoding parameters, the encoding parameters of the at least one second user-generated set being different than the encoding parameters of the at least one user-generated set.

21. The system of claim 19, further comprising a video display interface for outputting the plurality of frames and wherein if a value of the severity for a portion of the plurality of frames is greater than a predetermined threshold, the video display interface outputs the portion having the severity greater than the predetermined threshold for display.

22. The system of claim 15, wherein the encoder further groups the first plurality of frames into a first category and grouping the second plurality of frames into a second category based on a severity of at least one artifact of the at least two different artifacts.

23. The system of claim 15, further comprising a video display interface for outputting the plurality of video frames of the source video for display in a first portion of a display and outputting the each of the first and second portions of said plurality of frames of said encoded video for display in the single, user-defined category to enable re-encoding in a second portion of the display.

24. A system for enabling the reduction of artifacts in encoded video, the system comprising:
a scene detector that detects at least a first plurality of frames and a second plurality of frames of said source video from a received source video having a plurality of frames;
an artifact detector that detects at least two different artifacts in said first plurality of frames and said second plurality of frames, each of the at least two different artifacts being a different type of artifact;
an encoder that encodes the received source video and further groups each of the first plurality of frames and the second plurality of frames into a single, user-defined category defining a subset of artifacts including the at least two different artifacts upon determining the first plurality of frames and the second plurality of frames include the at least two different artifacts prior to re-encoding;
a video display interface that outputs for display the frames of video grouped into the single, user-defined category; and
a user interface that enables a user to select a set of user-generated encoding parameters from a library of preset sets of encoding parameters associated with the single, user-defined category such that the severity of the at least two different artifacts is reduced when the group including the first plurality of frames and the second plurality of frames of said encoded video are re-encoded.

25. The system of claim 24, further comprising a categorizer for determining a category for the at least two artifacts.

26. The system of claim 25, wherein the user interface further enables the user to select the at least one user-generated set of encoding parameters based on one of the determined categories.

27. The system of claim 24, wherein the artifact detector determines a severity for the at least one artifact of the at least two different artifacts for said first plurality of frames of encoded video.

28. The system of claim 27, wherein if a value of the severity for a portion of the plurality of frames is greater than a predetermined threshold, the video display interface outputs for display the portion having the severity greater than the predetermined threshold.

29. The system of claim 27, wherein the user interface enables a user to select the user-generated set of encoding parameters based on an artifact from the at least two artifacts having the highest determined severity.

30. The system of claim 24, wherein the user-generated set of encoding parameters is a first user-generated set of encoding parameters and wherein if the first user-generated set of encoding parameters does not remove the at least two artifacts, the user interface enables the user to select a second user-generated set of encoding parameters, the encoding parameters of the second user-generated set being different than the encoding parameters of the first user-generated set.

31. The system of claim 27, wherein the encoder groups the first portion of said plurality of frames into a first category and grouping the second portion of said plurality of frames into a second category based on a severity of at least one artifact of the at least two different artifacts.

32. The system of claim 24, further wherein the video display interface outputs the plurality of video frames of the source video for display in a first portion of a display and outputs each of the first and second portions of said plurality of frames of said encoded video in the single, user-defined category to enable re-encoding for display in a second portion of the display.

\* \* \* \* \*